Nov. 5, 1968  H. B. COLMAN, JR  3,408,977

READING AID

Filed March 14, 1966  3 Sheets-Sheet 1

INVENTOR
H. B. COLMAN JR.
BY Stoddard

ATTORNEY

Nov. 5, 1968  H. B. COLMAN, JR  3,408,977
READING AID
Filed March 14, 1966  3 Sheets-Sheet 2
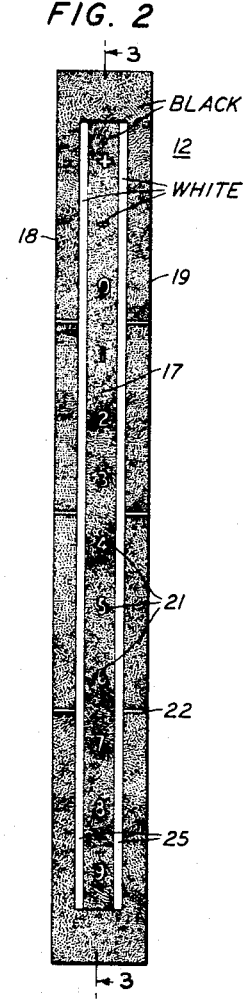
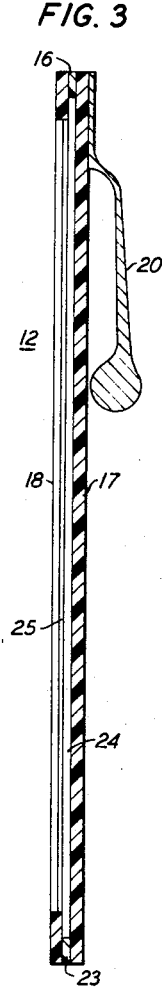
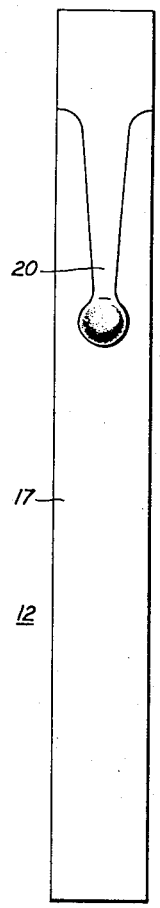

Nov. 5, 1968   H. B. COLMAN, JR   3,408,977
READING AID

Filed March 14, 1966   3 Sheets-Sheet 3

United States Patent Office 3,408,977
Patented Nov. 5, 1968

3,408,977
READING AID
Howard B. Colman, Jr., El Paso, Tex., assignor to Bell Telephone Laboratories Incorporated, New York, N.Y., a corporation of New York
Filed Mar. 14, 1966, Ser. No. 534,001
2 Claims. (Cl. 116—119)

ABSTRACT OF THE DISCLOSURE

A reading aid for use in interpreting the significance of data represented by holes punched through some of many indicia printed in a number of identical columns on a tabulating card. The reading aid comprises means forming a slotted area extending through the side of the device and having a width and height at least equal respectively to the thickness and width of a tabulating card so that a card can be slidably inserted therein. The reading aid further includes means forming an opening in the front thereof having a width and length approximately equal respectively to the width and height of a column of indicia on the card. Within this opening are means on the interior surface of the back portion of the reading aid for constituting a replica in a contrasting color of one of the identical columns of indicia on the card. Thus, when a tabulating card is inserted in the slotted area, a column of indicia is isolated by the opening in the reading aid and the contrastingly colored duplicate indicia on the reading aid can be seen through the holes punched in this column of the card. This serves to identify and to replace the indicia that were removed by the holes punched in the card.

---

This invention relates to reading aids and, more particularly, to a device for facilitating the visual reading or interpretation of the significance of data represented by holes punched in a card.

Punched cards, which are also known as tabulating cards, are widely used for recording information. These cards have indicia printed upon them in closely spaced parallel columns. Information is recorded on these cards by punching holes through certain selected indicia. In general, the holes are punched in accordance with one of several available codes which are based on utilizing various combinations of holes in the columns. For example, the Hollerith code employs combinations of no more than three holes in any one column, whereas the binary code uses as many as twelve holes in a column.

When these punched cards are to be used, they are ordinarily placed in a suitable machine, such as a computer, which scans the code holes punched in the cards and performs various functions involving the retrieval of the information recorded by means of the holes. However, it is sometimes desirable for an operator or a programmer to sort manually a stack of punched cards and visually read or interpret the code holes punched therein. This may be necessary to make sure that the holes have been properly punched in the correct locations. It may also be required for determining the significance of certain of the holes in order to rearrange the sequence of the cards in the stack. Another reason may be to educate or train operators so as to increase their comprehension and understanding of these punched cards.

Since each card may have eighty columns closly spaced thereon with the indicia arranged in twelve rows, it is difficult for an operator to identify quickly the specific code holes that have been punched in a particular column. This is especially perplexing in the case of cards punched in accordance with the binary code which, as was stated above, may have as many as twelve holes in any one column. Thus, when the binary code is used, there may be many holes in each of the eighty closely spaced columns on each card. This results in such a large number of holes in any one card that a viewer is presented with a bewildering spectacle which renders it difficult to identify each hole correctly.

Accordingly, it is an object of this invention to provide improved means for facilitating the visual reading or interpreting of code holes in punched cards.

Another object of this invention is to provide a reading aid for isolating any one of a large number of closely spaced columns on a punched card.

An additional object of this invention is to provide a reading aid for substituting duplicate indicia in place of indicia removed by holes punched in a tabulating card, the duplicate indicia being of a color which is in contrast with the color of the indicia printed on the tabulating card.

These and other objects of the invention are attained by employing a reading aid comprising a support portion having three parallel strip members depending therefrom. The two outer strip members are in a common plane while the middle strip member is in a different plane. These two planes are parallel and are separated by a spacing approximately equal to the thickness of a punched card. The two outer strip members are spaced apart by a distance approximately equal to the width of a column on a punched card. All three strip members have a color which contrasts sharply with the color of a punched card. In addition, the middle strip member has a column of indicia disposed thereon corresponding to the indicia in a column on a punched card but in a distinctively different color.

This reading aid is adapted to be mounted upon a punched card with the two outer strip members resting on the face of the card and the middle strip member placed against the back of the card. The reading aid is then positioned on the punched card in such a manner that the two outer strip members mask the columns of indicia on each side of the particular column that is to be visually read or scanned. In this condition, the outer strip members isolate the column that is to be read and the contrasting color of these strip members serves to quickly identify the desired column. At the same time, the indicia on the middle strip member can be seen through the holes punched in this particular column. Since the indicia on this middle strip member is distinctively colored, a person viewing the card can readily and accurately identify the specific holes that were punched in this column.

These and other features of the invention are more fully discussed in connection with the following detailed description of the drawing, in which:

FIG. 2 is a front elevational view of the reading aid;

FIG. 3 is a cross-sectional side elevational view of the reading aid taken along the line 3—3 in FIG. 2;

FIG. 4 is a rear elevational view of the reading aid; and

Figure 1:
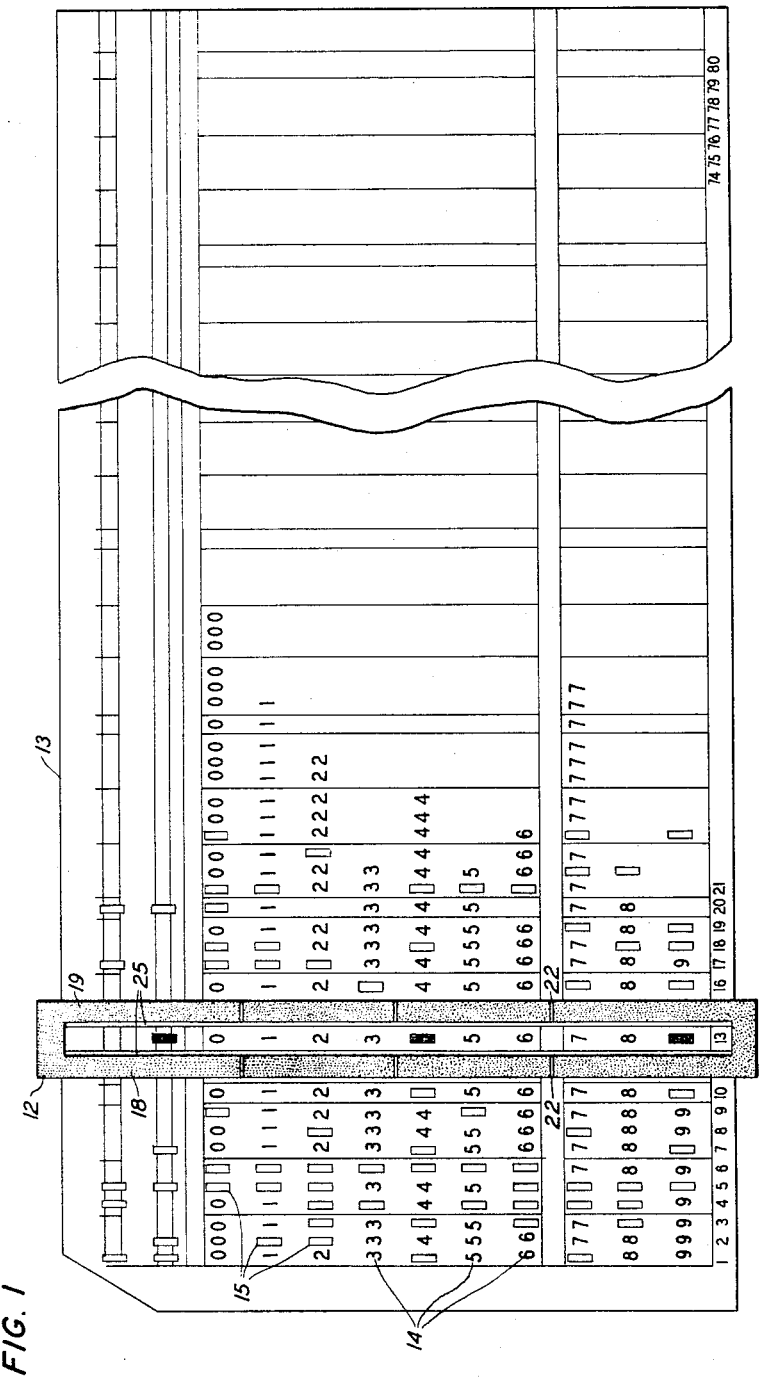
FIG. 1 is a view of the face of a punched card with the reading aid of this invention mounted thereon.

In FIG. 1, an exemplary embodiment of this invention is represented by the reading aid 12 which is shown to be mounted on a punched card 13. The card 13, which is ordinarily white, has a large number of indicia 14 printed thereon in black ink. For purposes of illustration, the card 13 is depicted as having that type of indicia 14 printed thereon which is adapted to be punched in accordance with the binary code as is indicated by the holes 15.

The indicia 14 is repetitively arranged in twelve parallel rows and is also repetitively disposed in eighty identical parallel columns which are closely spaced together on the card 13. In other words, the forms or shapes of the indicia 14 that are used in one column are the same as those used in each of the other columns on the card 13. As was stated above, use of the binary code permits as many as twelve holes to be punched in any one column. This, of course, may result in a very large number of holes being punched in some of the cards.

As is shown in FIG. 3, the reading aid 12 comprises a narrow support portion 16 which has approximately the same thickness as the punched card 13. One side of this support portion 16 is mounted at the upper end of a strip member 17. The other side of the support portion 16 has two other strip members 18 and 19 depending therefrom. These strip members 18 and 19, as well as the strip member 17, are fixedly attached to the support portion 16 by any convenient means, such as by screws or by an appropriate adhesive.

The two strip members 18 and 19 are disposed in a common plane which is parallel to the plane containing the first strip member 17. Since these two planes are separated by the support portion 16 which, as was stated above, has a thickness equal to the thickness of the card 13, it necessarily follows that the spacing between the two planes is also equal to the thickness of the punched card 13. The strip members 18 and 19 may be made separately or, if desired, they may be fabricated in either a single bifurcated piece or in the form of a single slotted member as shown in FIG. 2. It should be noted, by inspecting FIG. 1, that the spacing between the inner side edges of the strip members 18 and 19 is approximately equal to the width of a column on the card 13.

The strip member 17 is positioned in such a manner as to be parallel to the other strip members 18 and 19. In addition, the strip member 17 is so located as to lie behind the opening between the strip members 18 and 19 as is indicated in FIG. 2. The width of this middle strip member 17 should be at least equal to the spacing between the outer strip members 18 and 19. However, it may have a greater width as is shown in FIG. 4 where it is represented as having a width equal to the distance between the outer side edges of the other strip members 18 and 19. For convenience, a conventional pocket clip 20 is secured in a suitable manner, such as by screws or by an adhesive, to the top of the back surface of the strip member 17 as is illustrated in FIG. 4.

All three of the strip members 17, 18, and 19 have a color which contrasts sharply with the color of the card 13. As punched cards usually have a white color, the strip members 17, 18, and 19, in this construction of the invention, are colored black. This contrasting color need be applied to only the front surfaces of the strip members 17, 18, and 19 and, if desired, their other portions may be a different color.

The middle strip member 17 has a column of twelve indicia 21 inscribed on its interior surface in a color which is distinctively different from both the color of the front surface of the strip member 17 and the color of the indicia 14 on the punched card 13. Since, as was stated above, the color of both of these last mentioned items is black, the color of the indicia 21 in this embodiment of the invention is white. The forms or shapes of these twelve indicia 21 correspond to those of the indicia 14 that are in any one of the columns on the card 13. In addition, each of the indicia 21 is so disposed as to have the same vertical spacing, or separation, between them that is used between the card indicia 14. Thus, the column of indicia 21 on the strip member 17 is, except for its color, a replica of a column of indicia 14 on the card 13. This column of duplicate indicia 21 is positioned on the section of the interior surface of the middle strip member 17 that is visible through the viewing opening between the two outer strip members 18 and 19 as is shown in FIG. 2.

For convenience in quickly scanning the indicia 21, each of the outer strip members 18 and 19 has a plurality of horizontally disposed markings 22 thereon which are so located as to indicate the grouping by threes of the indicia 21. In other words, the markings 22 function, in effect, to separate the twelve indicia 21 into four groups with each group containing three of the indicia 21. If desired, the markings 22 could be positioned in such a manner as to divide the indicia 21 into different groups of various other sizes. The markings 22 are inscribed in a conspicuous color which, in this form of invention, is white.

The bottom, or lower, ends of the strip members 17, 18, and 19 can hang freely if desired. However, their rigidity can be improved by employing a lower support portion 23 having approximately the same thickness as the card 13. When this lower support portion 23 is incorporated in the reading aid 12, it should be so located that the distance between its upper edge and the lower edge of the upper support portion 16 is at least equal to the width of the punched card 13. As is indicated in FIG. 3, this lower support portion 23 has one of its sides affixed in any suitable manner, such as by screws or by an adhesive, to the lower end of the middle strip member 17 and has its other side similarly affixed to the lower ends of the outer strip members 18 and 19. Thus, the use of this lower support portion 23 in combination with the upper support portion 16 serves to maintain the desired spacing between the plane containing the middle strip member 17 and the plane containing the outer strip members 18 and 19.

The ends of the two support portions 16 and 23 together with the edges of the strip members 17, 18, and 19 define a slotted area 24 extending through the side edges of the reading aid 12 as is represented in FIG. 3. Since the height and width of this slotted area 24 are at least equal to the width and thickness, respectively, of the card 13, it is evident that the card 13 can be inserted therein. Thus, the slotted area 24 forms receiving means for slidably receiving the tabulating card 13. The side edges of the strip members 17, 18, and 19 may, if desired, be given a distinctive color, such as white, for the purpose of serving as a helpful guide during the process of inserting the card 13 into the slotted area 24. These side edges can be beveled for facilitating the insertion of the card 13.

It should be mentioned that it is also helpful to bevel the inner side edges of the two outer strip members 18 and 19 as is indicated in the drawing by the reference numeral 25. These beveled edges 25 are given a color, such as white, which contrasts sharply with the black color of the front surfaces of the strip members 17, 18, and 19.

In using the reading aid 12, a punched card 13 is inserted in the receiving means comprising the slotted area 24 with the colored beveled edges of the strip members 17, 18, and 19 facilitating the admittance of the card 13 into the area 24. In other words, the reading aid 12 is mounted in such a manner that its two outer strip members 18 and 19 lie against the face of the card 13 while the front, or interior, surface of its middle strip member 17 is placed against the back of the card 13. The reading aid 12 is then moved along the card 13 until the particular column of indicia 14 that is desired to be visually read or scanned, such as the thirteenth column, is positioned directly over the column of duplicate indicia 21 on the middle strip member 17 as is illustrated in FIG. 1.

It can be seen from inspection of FIG. 1 that, when the reading aid 12 is in this location, the two outer strip members 18 and 19 form a viewing opening and mask the columns of indicia 14 that are on each side of the desired column. Thus, the outer strip members 18 and 19 function to isolate the particular column that is to be scanned. In addition, the color of these strip members 18 and 19, which is in sharp contrast to the color of the card 13, serves to quickly identify the desired column.

Figure 5:
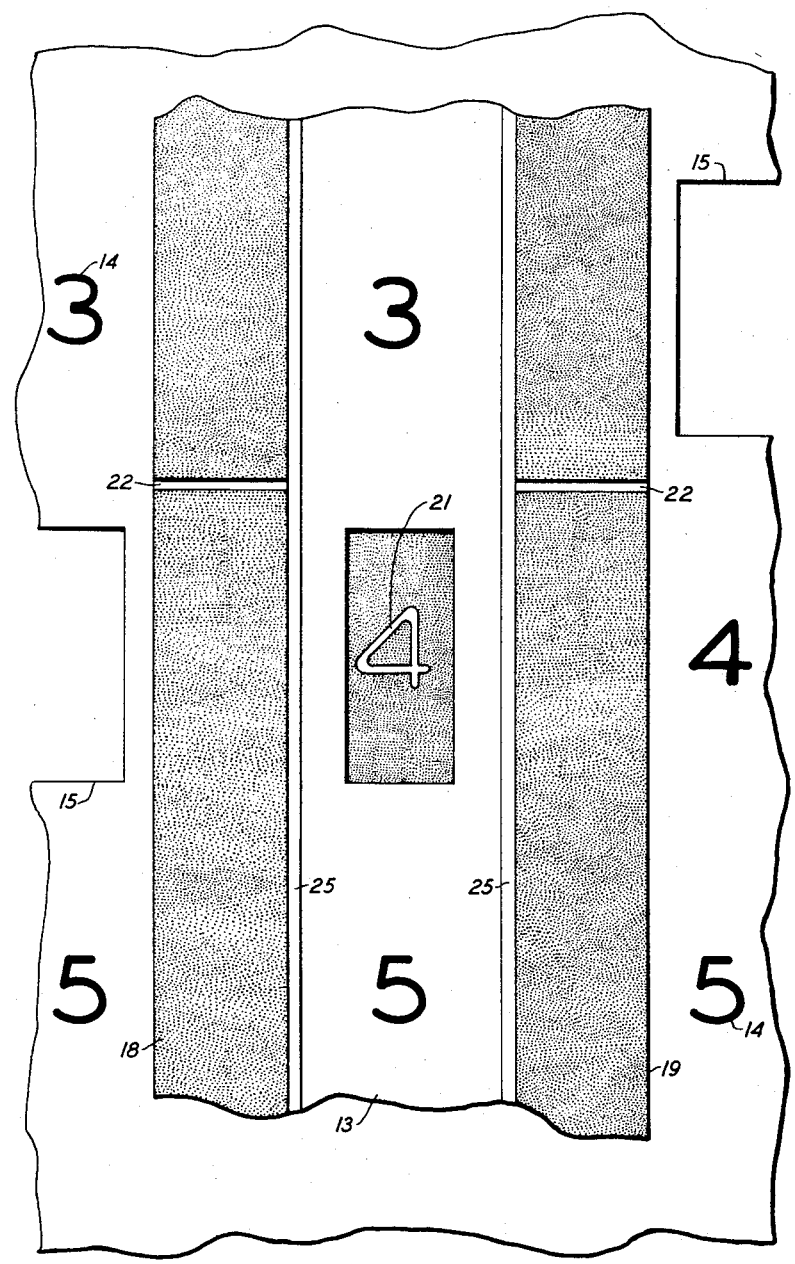
FIG. 5 is an enlarged view of a portion of FIG. 1.

Now, with the reading aid 12 in this position, certain of the duplicate indicia 21 on the middle strip member 17 can be seen through the holes 15 in the particular column of the card 13 that is being scanned. Since the duplicate indicia 21 on the middle strip finger 17 is distinctively colored, as is best shown in FIG. 5, a person viewing the card can readily and accurately identify the specific holes that were punched in this column. During this scanning procedure, the colored horizontal lines 22 on the outer strip members 18 and 19 function to assist in grouping the scanned duplicate indicia 21.

What is claimed is:

1. A reading aid adapted for use in interpreting the significance of data represented by holes punched through some of many indicia printed in a number of identical columns on a tabulating card, said reading aid comprising receiving means for slidsitely disposed side portions and a back portion having an interior surface, said reading aid comprising receiving means for slidably receiving a tabulating card therein, said receiving means including means defining a slotted area in each of said side portions and extending through said reading aid, said slotted area having a width and height at least equal respectively to the thickness and width of a tabulating card, viewing means for viewing a single column of indicia printed on a tabulating card, said viewing means including means defining an opening in said front portion for rendering visible at least a section of said interior surface of said back portion, said opening having a width and length approximately equal respectively to the width and height of one of said identical columns of indicia on a tabulating card for adapting said opening for isolating any one of said columns when a card is received within said receiving means, and substituting means adapted for substituting duplicate indicia in place of indicia removed by said holes punched in any of said columns isolated by said viewing means, said substituting means including means on said visible section of said interior surface of said back portion for forming thereon a replica of said indicia contained in one of said identical columns.

2. A reading aid adapted for use in interpreting the significance of data represented by holes punched through some of many indicia printed in a first color in a number of identical columns on the face of a tabulating card, said face of said card having a second color which is in contrast with said first color, said reading aid having a front portion and two oppositely disposed side portions and a back portion having an interior surface, said interior surface being of said first color, said reading aid comprising receiving means for slidably receiving a tabulating card therein, said receiving means including means defining a slotted area in each of said side portions and extending through said reading aid, said slotted area having a width and height at least equal respectively to the thickness and width of a tabulating card, viewing means for viewing a single column of indicia printed on a tabulating card, said viewing means including means defining an opening in said front portion for rendering visible at least a section of said interior surface of said back portion, said opening having a width and length approximately equal respectively to the width and height of one of said identical columns of indicia on a tabulating card for adapting said opening for isolating any one of said columns when a card is received within said receiving means, and substituting means adapted for substituting duplicate indicia in place of indicia removed by said holes punched in any of said columns isolated by said viewing means, said substituting means including means on said visible section of said interior surface of said back portion for forming thereon a column of indicia which is a duplicate in respect to shape of one of said identical columns, and said duplicate column of indicia being of said second color for creating a contrast with the indicia on said card whereby said duplicate indicia is readily distinguishable therefrom when viewed through said holes in a tabulating card received within said receiving means.

References Cited

UNITED STATES PATENTS

| 1,334,525 | 3/1920 | Denhard | 116—119 |
| 1,353,279 | 9/1920 | Schulthess | 40—352 |
| 1,607,544 | 11/1926 | McCready. | |
| 2,359,687 | 1/1951 | Barsotti | 116—119 |
| 2,871,816 | 2/1959 | McConnell | 116—119 |
| 3,269,752 | 8/1966 | Lindamah | 283—65 |

FOREIGN PATENTS

| 25,090 | 1904 | Great Britain. |
| 612,875 | 11/1948 | Great Britain. |

LOUIS J. CAPOZI, *Primary Examiner.*